Dec. 7, 1948.  E. A. McCOY  2,455,512
BOURDON TUBE END CAP
Filed Sept. 20, 1946
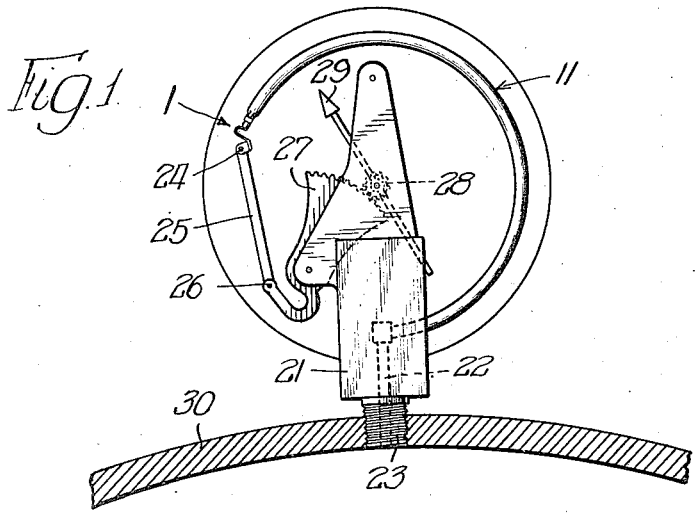
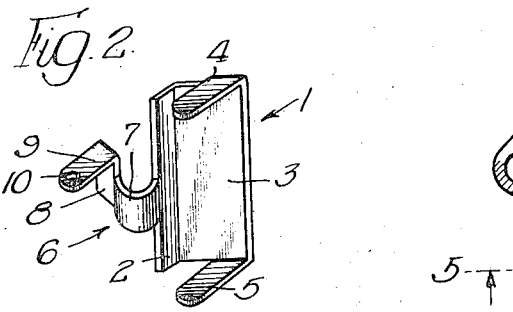
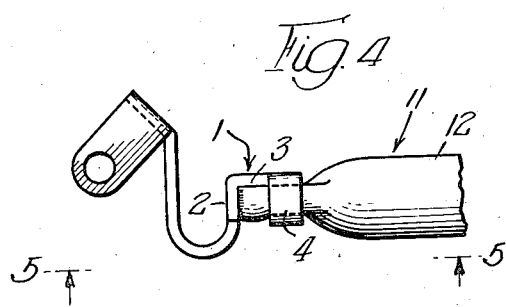
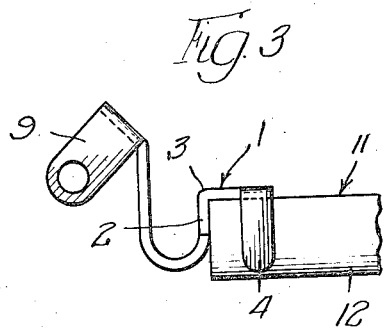
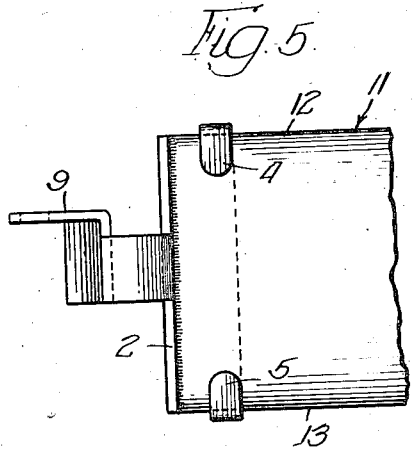
INVENTOR.
Edward A. McCoy,
BY
Brown Jackson Boettcher & Dienner
ATTYS.

Patented Dec. 7, 1948

2,455,512

UNITED STATES PATENT OFFICE 2,455,512

BOURDON TUBE END CAP

Edward A. McCoy, Eau Claire, Wis., assignor, by mesne assignments, to Jas. P. Marsh Corporation, Skokie, Ill., a corporation of Illinois Application September 20, 1946, Serial No. 698,349

5 Claims. (Cl. 73—418)

My invention relates to a fitting for a Bourdon tube or the like and more particularly to a fitting which closes the end of the Bourdon tube and provides means for connecting the end of the tube to some associated mechanism.

Heretofore, it has been a problem to close the end of a flat arcuate Bourdon tube which is employed in a pressure gauge and to make a connection between the end of the tube to linkage which, for example, operates a gear sector for actuating the pinion which carries the indicator hand of the gauge.

It is an object of my invention to provide an inexpensive, one-piece, fitting which may be made by a stamping operation for closing the end of a Bourbon tube and for providing a connection with associated linkage or other mechanism.

It is a further object of my invention to provide a fitting which is easily, quickly and accurately positioned with respect to the end of a Bourdon tube and which is pinched upon the end of the tube so that it may be held on said end mechanically prior to the soldering operation and will not drop off or become dislocated in handling.

It is still another object to provide a fitting constituting an end closure and an integral link which requires a minimum of material whereby the weight of the fitting is minimized to permit more accurate and sensitive adjustment of the gauge incorporating a Bourdon tube. The fitting of my invention permits the accurate location of the eye with respect to the end of the tube and the action of pinching or collapsing the fitting upon the end of the tube insures more certain sealing of the tube when soldered and at the same time mechanically fastens or clamps the fitting in its predetermined position so that it will not drop off or become dislocated and it is then more easily soldered definitely in position and the solder more certainly seals the pinched or clamped end.

Other objects and advantages of my invention will become apparent from a reading of the following description and from the related drawings in which:

Figure 1 is an elevational view, partially in section, showing the fitting of my invention, a Bourdon tube and associated mechanism of a pressure gauge;

Figure 2 is a perspective view of the fitting embodying my invention;

Figure 3 shows the fitting as initially applied to the end of a Bourdon tube;

Figure 4 is a side elevation of the fitting and Bourdon tube after the assembling steps are completed; and Figure 5 is a view, looking in the direction of the arrows 5—5 of Figure 4, of the fitting and Bourdon tube of Figure 4 showing the tube end and fitting secured together with the end of the tube being sealed by solder. Like reference numerals have been employed in the several views to represent the same elements.

Reference will first be made to Figure 1 wherein a pressure gauge embodying my fitting 1 is diagrammaticaly shown. As may be seen from the drawing, it is desirable that the fitting 1 and its integral connecting link 6 be light weight but sturdy since the fitting is connected at the outer end of the curved Bourdon tube 11. The tube 11 at its other end is secured in a block 21 which block has a passageway 22 connecting said other end of the tube 11 with the hollow threaded portion 23 which is adapted to be connected with the chamber 30 in which pressure is generated. The integral adjustable link 6 of the fitting 1 has a pivoted connection 24 with a link 25 which in turn has a pivoted connection 26 at its other end with the arm of a gear sector 27. The gear sector 27 is in mesh with a pinion 28 to which the indicator hand 29 of the gauge is connected. The fluid under pressure in the chamber 30 will enter the passageway 22 through the hollow threaded portion 23 and will then enter the Bourdon tube 11 and will tend to straighten it. The fluid under pressure will not escape from the Bourdon tube because fitting 1 serves as an end cap for the tube. The tendency of the tube to straighten itself will then cause the free end of tube 11 to move in a clockwise direction and pull upon the link 25. The gear sector will thereupon be actuated and will rotate the pinion 28 and the indicator hand 29. A dial (not shown) associated with the indicator hand 29 will then show the pressure within the chamber 30.

Referring now to Figure 2, the reference numeral 1 indicates generally the fitting embodying my invention. The fitting 1 comprises a closure wall 2, a lateral wall or body portion member 3 at right angles to the closure wall and a pair of spaced apart arms 4 and 5 which lie in planes which are at right angles to both the walls 2 and 3. An adjustable U-shaped link indicated generally by the reference numeral 6 is connected to the edge of the closure wall 2 at its center. The arms of the U-shaped portion 7 of link 6 may be adjusted with respect to each other during final assembly or testing of the gauge in order to calibrate it properly. At the free end of the U-shaped portion 7 of the adjustable link 6 there is an angled member 8 having a right angled extension 9. A hole 10 is located at an end of extension 9 for a pivoted connection with a link such as link 25 of Figure 1.

Referring now to Figure 3 wherein the Bourdon tube is indicated generally by the reference numeral 11, it will be seen that the fitting 1 is adapted to have its spaced apart arms 4 and 5 slipped over the narrow rounded sides 12 and 13, respectively, of the tube 11 and to have the closure wall 2 abutting against the open end of said tube. It is a simple matter to locate the fitting on the end of the tube by first slipping the arms 4 and 5 over the edges of the tube until the lateral wall 3 abuts against the tube and then sliding the fitting longitudinally of the tube until the closure wall 2 is in engagement with the open end of the tube. The lateral wall 3 which is positioned against the flat broad side of the tube 11 also assists in properly locating the wall 2 with respect to the end of the tube, that is, it prevents the fitting from being tilted or rotated about the narrow rounded sides 12 and 13 of the tube 11 with consequent misalignment of wall 2 with the end of the tube.

When the fitting 1 is properly positioned with respect to the end of the tube 11 a pressing or stamping operation is performed whereby the end of the tube 11 is pinched shut and the arms 4 and 5 of the fitting 1 are turned toward each other and into gripping relation with the underside of the tube, that is, the side opposite to the one with which the lateral wall 3 is in engagement. The arms 4 and 5 together with the wall 3 thereby form a partial collar about the pressed end of the tube 11 and, as will be seen most clearly in Figure 4, the very outermost end of the tube which lies between the closure wall 2 and the arms 4 and 5 will be slightly bulged in the pressing operation so that the fitting will not slip off the end of the tube. Such a gripping connection is very desirable since it prevents the fitting from slipping off the tube prior to or during the soldering operation which follows. The soldering operation then serves permanently to secure the fitting to the tube and also seals the end of the tube.

Although I have illustrated my invention in connection with the Bourdon tube of a pressure gauge it will be appreciated that the closure fitting with or without the link may have other uses. Consequently I do not intend to be limited to the illustration of the preferred embodiment, except in so far as the appended claims are so limited, since certain changes may be made therein without departing from the scope of my invention.

I claim:

1. An integral fitting for a Bourdon tube comprising a pair of spaced apart arms adapted to embrace opposite sides of the tube, a closure wall adapted to abut against the open end of the tube, said wall having a right angle extension connecting the wall with said arms and being adapted to lie against the surface of said tube, said arms being of such a length as to permit them to be pressed toward each other and into engagement with the surface of said tube opposite said extension to embrace the tube when the end of the tube is compressed to close it.

2. A fitting for a Bourdon tube comprising a closure wall adapted to abut against the open end of the tube; a lateral wall connected therewith and adapted to lie against a broad side of the tube, a pair of arms connected with the lateral wall and adapted to lie against opposite narrow sides of the tube, said arms being adapted to be pressed into gripping relation with said narrow sides and with the broad side of the tube opposite said lateral wall to thereby embrace the end of the tube when said end is compressed to close the same.

3. A Bourdon tube closure and connection comprising the end of a Bourdon tube of oblong cross section having a flattened extremity and a fitting comprising a body portion on one side of the flattened portion of said tube, said body portion having an extension providing an element of a pivotal connection and having an intermediate shoulder abutting the extreme end of the tube, there being lateral arms on said body portion embracing the flattened portion and holding the fitting fixedly upon the end of the tube, said fitting and tube end being further united by solder and the end of the tube being sealed with solder.

4. A fitting for the end of a Bourdon tube, comprising means adapted to engage the tube and including a pair of spaced apart arms adapted to fit against opposite sides of the tube and a lateral portion interconnecting said arms and adapted to fit against a side of said tube intermediate said opposite sides; and a closure wall connected with the tube engaging means and adapted to abut against the open end of the tube.

5. A fitting for the end of a Bourdon tube, comprising means adapted to engage the tube and including a pair of spaced apart arms adapted to fit against opposite sides of the tube and a lateral portion interconnecting said arms and adapted to fit against a side of said tube intermediate said opposite sides; a closure wall connected with the engaging means and adapted to abut against the open end of the tube; and an adjustable link joined to said closure wall.

EDWARD A. McCOY.

REFERENCES CITED

The following references are of record in the file of this patent:

UNITED STATES PATENTS

| Number | Name | Date |
|---|---|---|
| 1,821,669 | Rudolph | Sept. 1, 1931 |

FOREIGN PATENTS

| Number | Country | Date |
|---|---|---|
| 276,445 | Germany | July 13, 1914 |